United States Patent [19]

Endo

[11] Patent Number: 4,752,068
[45] Date of Patent: Jun. 21, 1988

[54] VIDEO GAME MACHINE FOR BUSINESS USE

[75] Inventor: Masanobu Endo, Tokyo, Japan

[73] Assignee: Namco Ltd., Tokyo, Japan

[21] Appl. No.: 927,791

[22] Filed: Nov. 5, 1986

[30] Foreign Application Priority Data

Nov. 7, 1985 [JP] Japan .................... 60-250048
Jan. 22, 1986 [JP] Japan .................... 61-10260

[51] Int. Cl.⁴ .............................................. A63F 9/22
[52] U.S. Cl. ............................ 273/1 E; 273/DIG. 28
[58] Field of Search ............ 273/1 E, 856, 148 B, 273/DIG. 28; 340/825.3, 825.31, 825.34, 825.35, 323 R; 364/410, 411, 141, 146, 191, 193, 900

[56] References Cited

U.S. PATENT DOCUMENTS 4,490,810 12/1984 Hon ................... 273/DIG. 28 X
4,566,061 1/1986 Ogden et al. .............. 364/146
4,570,930 2/1986 Matheson ........... 273/DIG. 28 X
4,639,225 1/1987 Washizuka ............ 273/148 B X Primary Examiner—T. H. Tubbesing
Assistant Examiner—Gilberto Barron, Jr.
Attorney, Agent, or Firm—Koda and Androlia

[57] ABSTRACT

A video game machine for business use for playing a long video game including a status memory for storing status data which represents the status of the game stopped, a forward conversion circuit for converting the status data to an easy-to-remember password by using a forward conversion function, a display circuit for displaying the password for the game player, a password input device into which the player inputs the password when he resumes the game, and a backward conversion circuit for converting the password inputted to the status data of the game stopped by using a backward conversion function. The initial condition of the game is set by the status data obtained by the backward conversion, and the game can be resumed from where it was stopped.

15 Claims, 2 Drawing Sheets

VIDEO GAME MACHINE FOR BUSINESS USE

BACKGROUND OF THE INVENTION

1. Field of the Invention

The present invention relates to a video game machine for business use and, more particularly, to the improvement of a game machine used for a long-time video game.

2. Description of the Prior Art

Various kinds of video games are played by using video game machines for business use or home video game machines. Video games are largely separated into two kinds, namely, short-time games and long-time games depending upon the time required for playing one game.

Short-time games the programs of which are simpler in comparison with those of long-time games form the majority of the present video games. Most of the games played with video game machines for business use are short-time games, because short-time games which requires a comparatively short time for playing one game are advantageous from the point of view of business.

Such short-time games are, however, apt to be monotonous and involves a danger of boring the players.

On the other hand, long-time games which require a long time for playing one game can have a story as a whole and be full of variety.

As such long-time video games having a story, adventure games such as a treasure-hunting game, a go-through-labyrinth game are known.

For example, a treasure-hunting game is composed of a short story consisting of 20 stages. When the hero has completed predetermined treasure-hunting using a shovel, a key and so forth at one stage, the scene is moved to the next stage, and new treasure-hunting is begun in accordance with the story at the stage.

A go-through-labyrinth game is also known in which a plurality of checkpoints are set at each stage, one of which is set as a key for threading the labyrinth, and the others as treasure for making scores, and when the hero finds a key for threading the labyrinth at each stage the door for leading to the next stage is open.

In such an adventure game, when the hero finds out a checkpoint which is a key to each stage, the door leading to each stage is continuously kept open, and when the hero proceeds to the 20th stage, it is also possible to return to the previous stages to find out the treasure which remains un-found and to increase the scores.

Such a long-time video game generally requires several hours to end one game, and it is therefore necessary to make the game such that when it is suspended from the needs of the body or other reasons, it is possible to resume the game from the state in which it has been suspended.

To this end, a home game machine is provided with a dedicated memory for storing the progress data representing the state of games at the time of the interruption of the game, for example, a main factor which represents the state of the stage at the time of the interruption of the game and a sub factor which represents the history of the hero (for example, in the above-described treasure-hunting game, the number of treasure found, the number and the performance of shovels to be used, and the kinds of keys to open the doors) at the t the time of the interruption of the game.

When the game is suspended, the main factor and the sub factor which represent the progress of the game are temporarily stored, and when the game is resumed, these factors are read from the memory to set the initial condition of the game and the game is resumed from the state in which it has been suspended.

In a game machine for business use, however, the playing time per game is limited to a short time for business' sake, and it is difficult to adopt such a long-time video game as described above as it is.

It may be possible to provide a dedicated internal memory to a video game machine for business use similarly to a home video machine.

However, most players enjoy the same game with different machines at different game houses at different times. Therefore, even if a dedicated internal memory such as described above is attached to each game machine, the stored data are scarcely practically used.

Furthermore, since such a video game machine for business use is used by many and unspecified players, if a dedicated internal memory similar to that of a home game machine is attached, the necessary capacity of memory becomes very large. Thus, attachment of a dedicated internal memory to a video game machine for business use is unpractical.

It may be possible to sell a memory card exclusively for a long-time game at each game house and to write and store the status data on the progress of the game on the individual card, thereby enabling the player to resume the game with the same kind of game machine from the state in which it has previously been suspended.

However the method of selling a card exclusive for an external memory is undesirable because it compels the player to spend extra cost for buying the card and to control the card.

SUMMARY OF THE INVENTION

Accordingly, it is an object of the present invention to eliminate the above-described problems in the prior art and to provide a video game machine which is capable of carrying out a long-time video game without a memory exclusive for an individual player.

To achieve this aim, in one aspect of the present a video game machine for business use which is capable of carrying out a long-time video game is provided, the video game machine comprising:

a status memory for storing status data which represents the progress of a game at the time of the interruption of the long-time video game;

a forward conversion circuit for converting the status data to a password which is easy to remember to the player by using a predetermined forward conversion function and for outputting the password, the forward conversion circuit being exclusive to the particular long-term video game;

a display circuit for displaying the output password to the player;

a password input device into which the password is input by the player at the time of resuming the game; and a backward conversion circuit for converting the input password to the status data at the time of the interruption of the game by using a predetermined reverse conversion function and for outputting the status data;

characterized in that the initial condition is set on the basis of the status data output from the backward conversion circuit and the game is resumed from the state in which the game has been suspended.

In another aspect of the present invention a video game machine for business use which is capable of carrying out a long-time video game is provided, the video game machine comprising:

a status memory for storing status data which represents the progress of a game at the time of the interruption of the long-time video game;

an identification memory for storing player identification data;

a forward conversion circuit for converting the combination of the status data and the identification data which are stored in the status memory and the identification memory to a password which is easy to remember to the player by using a predetermine forward conversion function and for outputting the password, the forward conversion circuit being exclusive to the particular long-term video game;

a display circuit for displaying the output password to the player;

an input device into which the password and the player identification data are input by the player at the time of resuming the game;

a backward conversion circuit for converting the input password to the status data and the player identification data at the time of the interruption of the game using a predetermined reverse conversion function and for outputting the status data and the identification data; and a game starting command circuit for outputting a game resumption enabling signal when the player identification data output by the backward conversion circuit coincides with the player identification data which is directly input from the input device;

characterized in that when the game resumption enabling signal is output by the game starting command circuit, the initial condition is set on the basis of the status data which is output by the backward conversion circuit and the game is resumed from the state in which the game has been suspended.

Most status data at the time of the end of a long-time video game generally consist of a main factor which represents the progress of the game and a sub factor which represents various kinds of data annexed to the game. Therefore, it is preferable in the first aspect and the second aspect of the present invention that a main factor and a sub factor are written and stored as the status data.

If a game has no sub factor, a main factor alone is stored as the status data.

The operation of the present invention having the above-described structure will be explained in the following.

Since a video game machine for business use sets the playing time per game is set at a predetermined short time, if a long-time video game is played with such a game machine, the game is to be suspended every time one playing time has passed.

In a video game machine in accordance with the first aspect of the present invention, the progress of the game at the time of the interruption of the game is temporarily stored as status data in the status memory, and is converted to a password easy to remember to the player, the password being displayed.

When the player resumes the interrupted long-time video game at a different place or at a different time, the player inputs the password which has been displayed when the game has been interrupted.

The input password is then converted to the status data for the game by using a backward conversion function. The game machine sets the initial condition on the status data obtained by backward conversion and resumes the game from the state in which the game has been suspended at the previous time.

Thus, according to the present invention, it is possible to play a long-time video game successively merely by inputting the password displayed at the time of the interruption of the game without using any special external memory device.

In addition, according to the present invention, it is possible to play a long-time video game successively with another video game machine of the same kind which is installed in another game house merely by inputting the password, thereby enabling a long-time video game without being restricted by time or place.

In the first aspect of the present invention, however, the same password is displayed for the same progress of the game at the time of the interruption of the game, thereby involving a danger of the process for making the password being analyzed.

If the password is analyzed and the player can resume the game from the point which the player has not reached yet, it is unfavorable to a video game machine for business use, and an effective countermeasure is required.

The video machine according to the second aspect of the present invention solves such a problem. It is characterized in that it is possible to make a password which is easy to remember to the player and difficult to analyze.

According to the second aspect of the present invention, a combination of the status data representing the progress of the game at the time of the interruption of the game and the player identification data is converted to a password by using a predetermined forward conversion function. Therefore, even the progress of the game at the time of the interruption of the game is the same, a different password is displayed depending upon the different player identification data.

In order to resume the game, the player must input the player identification data as well as the password displayed at the previous time.

Then, the game machine converts the input password to the status data and the player identification data by using a predetermined backward conversion function.

Judgement is made as to whether or not the player identification data which is obtained by backward conversion coincides with the player identification data which is input anew by the player at the time of the resuming the game, and when both agree the game is resumed from the state in which the game has been suspended, as is the case with the game machine of the first aspect of the present invention.

Thus, according to the second aspect of the present invention, since the combination of the status data of the game and the player identification data is converted to a password by using a predetermined forward conversion function, it is possible to make the password easy to remember to the player and difficult to analyze.

Furthermore, according to the second aspect of the present invention, in order to resume the game it is necessary to input the identification data of the player as well as the password, and the game can be resumed only when the identification data coincides with the identification data obtained by backward conversion.

Therefore, according to the second aspect of the present invention, the game is not resumed when another player inputs only the password displayed at the time of the interruption of the game, and the game machine only allows each player to resume the game from the point which each player has really reached.

As mentioned above, according to the present invention although the available playing time of a video game machine for business use is fixed and relatively short, a long-time video game can be played effectively without using particular external memories.

Incidentally, the forward conversion circuit and backward conversion circuit used in the business video game machine of this invention is not a type which is applicable in various kinds of games.

Video game machines in business use are different in kind of games to be played. As a result, the status data which indicate the progress of the game differ in the length and format.

Accordingly, status data for one kind of game cannot be used as status data of other kind of game, and it is meaningless to design such that the forward conversion circuit and backward conversion circuit have a compatibility to be used in various kinds of games.

Thus, in the present invention the forward and backward conversion circuits are those designed solely for a particular long-time video game of a game machine.

However, the present invention does not exclude from the scope of the invention the case in which peculiar forward and backward conversion functions coincide with forward and backward conversions of other kind of game nor the case in which the particular forward and backward conversions can be used in a plurality of different kinds of games.

However, in most cases the status data differ depending upon kinds of games in the length and format of games. Thus, when the video game has been changed, the functions must be reset so that the thus reset functions comply with the forward and backward conversion functions of the changed game.

The above and other objects, features and advantages of the present invention will become clear from the following description of the preferred embodiments thereof, taken in conjunction with the accompanying drawings.

DESCRIPTION OF THE PREFERRED EMBODIMENTS

Embodiments of the present invention will be explained in the following with reference to the accompanying drawings.

Long-time Video Game

Various kinds of long-time video games are known, and each of them generally has a story as a whole and is full of variety.

In this embodiment, a description will be made for a game machine which plays a go-through-labyrinth game for the purpose of providing an easy explanation.

Rule 1

Four check points are provided in the labyrinth at each stage. The labyrinth at one stage is considered to have been threaded when all the check points at the stage have been passed through and the goal has been reached.

Rule 2

When the hero has found his way out at one stage, he proceeds to the next stage at which a more difficult labyrinth is provided.

Rule 3

The labyrinth provided at each stage should be threaded in a predetermined time, and if time is over before the labyrinth is threaded, the game is also over.

The go-through-labyrinth game having the above-described rules requires at least several hours to go from the fist stage to the 16th stage.

In a video game machine for business use, one playing time is measured from the time when a coin is inserted, and the time which allows the game to be played is set at a predetermined short time. Therefore, regardless of the progress of the game, the game is interrupted whenever one playing time has passed. The progress of the game at the time of the interruption of the game is specified by status data represented by a main factor and a sub factor.

The main factor represents the number of the stages which have been passed by the time of the interruption of the game, namely, the number of the stage previous to the stage displayed on the game machine at that time. The sub factor represents the history of the hero at the time of the interruption of the game. In the embodiments, it represents which checkpoints the hero has passed at the stage displayed on the game machine at that time.

The feature of the present invention lies in that the status data representing the progress of the game at the time of the interruption of the game is displayed by a password obtained by converting the status data using a predetermined conversion function, and the recumption of the game is enabled form the state in which the game has been suspended by using the displayed password.

First Embodiment

Figure 1:
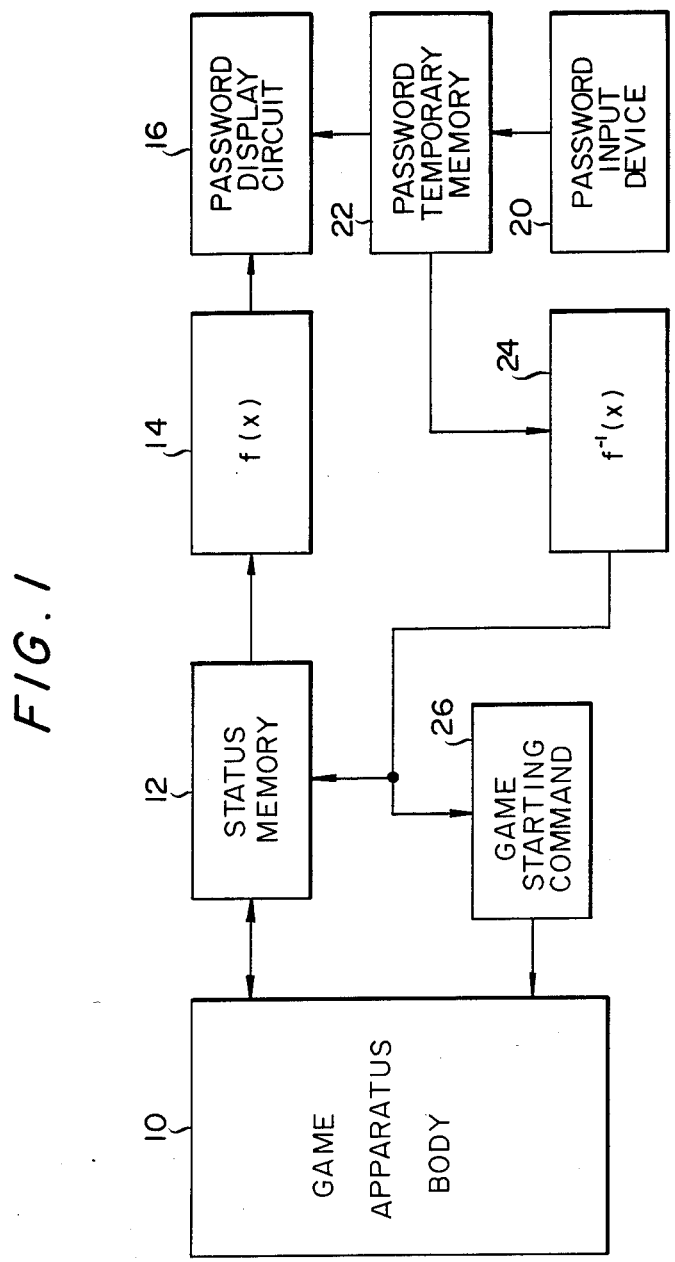
FIG. 1 is a block diagram of a first embodiment of a video game machine for business use according to the present invention.

FIG. 1 shows a first embodiment of the present invention. In a video game machine for business use according to the embodiment, the above-described go-through-labyrinth game is carried out by a game apparatus body 10.

When one playing time is over and the game is interrupted, the game apparatus body 10 writes and stores in a status memory 12 status data representing the progress of the game at the time of the interruption of the game.

In this embodiment, the status data is indicated by eight digit binary numbers of 00000000 to 11111111. The higher four digits of the eight digit binary numbers are the main factor which represents the number of [0] to [15] of the stages which have been passed by binary numbers of 0000 to 1111, while the lower four digits are a sub factor which represents whether or not the four checkpoints at the stage displayed at the time of the interruption of the game have been passed respectively by binary numbers of [0] and [1].

For example, if the 11th stage has been passed and the first and fourth checkpoints have been passed at the 12th stage at the time of the interruption of the game, the main factor is indicated by the four digit binary numbers [1011] which represents the 11th stage and the sub factor is indicated by the four digit binary numbers [1001] which represents that the first and the fourth checkpoints have been passed. The status data is therefore [1011/1001].

The status data at the time of the interruption of the game which is written and stored in the status memory 12 in this way is input in a forward conversion circuit 14 to convert it to a password using a forward conversion function, and the password is output to a password display circuit 16.

As a forward conversion function used in the forward conversion circuit 14, any desired functions can be used pursuant to the status data written in and stored in the status memory 12.

It should be noted that the forward conversion functions utilized in the present invention is not a universal forward conversion function which can be used for various kinds of video games. The forward conversion function is one arranged in the same manner for the same type of video games. In this embodiment, the forward conversion function arranged solely for a go-through-labyrinth game played by the game machine is used.

Furthermore, in this embodiment, the status data comprises a main factor and sub factor which are represented by four digit binary numbers. Thus, the forward conversion function of this embodiment is arranged such that it forward converts the four digit binary numbers represented by 0000-1111 in accordance with Table 1.

Therefore, if the 11th stage has been passed and the first and the fourth checkpoints have been passed at the 12th stage at the time of the interruption of the game, the status data written in the status memory 12 consists of the main factor which represents the completion of the 11th stage and is indicated by the binary numbers [1011], and the sub factor which represents that the first and fourth checkpoints at the 12th stage have been passed and is indicated by the four digit binary numbers [1001], as described above.

The status data [1011/1001] is converted in the forward conversion circuit 14 to the password [0110/0101] by using the forward conversion function shown in Code Table 1, and this password is output to the password display circuit 16.

The password display circuit 16 converts the password which is input in this way to alphabetical characters in accordance with Code Table 2, and displays two characters as the password easy to remember to the player.

Therefore, if the 11th stage has been passed and the first and fourth checkpoints at the 12th stage have been passed at the time of the interruption of the game, as described above, the characters [GF] are displayed on the CRT by the password display circuit 16.

When the game is resumed by using the password displayed in this way, the password which has been displayed at the time of the interruption of the game, for example, [GF] is input in a password input device 20.

The password [GF] input in this way is written and stored in a password temporary memory 22 as eight digit binary numbers in accordance with Code Table 2, and is displayed in the form of the alphabetical characters on the CRT by the password display circuit 16. Therefore, the player can confirm the characters on the CRT when he inputs the password.

When the password has been input, the backward conversion circuit 24 converts the eight digit binary numbers written in the password temporary memory 22 to status data in accordance with Code Table 1, and this status data is stored in the status memory 12.

After the status data has been written in the status memory 12 in this way, a game starting command circuit 26 outputs a game resumption enabling signal to the game apparatus body 10. The game apparatus body 10 thereby sets the initial condition on the basis of the status data written in the status memory 12 and allows the game to be resumed.

The game starting command circuit 26 is so designed that when the status data written in the status memory 12 is not included in the predetermined data of the long-time video game, in other words, if the data is out of bounds of the predetermined status data, the game starting command 26 outputs no game resumption enabling signal and commands the player to re-input the correct password or cancels the input password to start the game from the very beginning.

As described above, in order to resume the game with the game machine of this embodiment, the password input device 20 is used to input the password displayed at the time of the interruption of the game, for example, the password of the characters [GF].

The input password [GF] is temporarily stored in the password temporary memory 22 as the eight digit binary numbers [0110/0101], and the data of the eight bits is converted to the status data [1011/1001] for the game in accordance with Table 1 by the backward conversion circuit 24 and is written and stored in the status memory 12.

The data [1011/1001] written in the status memory 12 at this time represents the progress of the game at the time of the interruption of the game, namely, that the 11th stage has been passed and the first and fourth checkpoints at the 12th stage have been passed. It will therefore be understood that the game machine sets the initial condition on the basis of the status date written in the status memory 12 and allows the game to be resumed from the state in which the game has been suspended at the previous time.

Thus, according to the present invention, it is possible to resume the game from the state in which the game has been suspended at the previous time without the need for any external memory by using the password displayed at the time of the interruption of the game.

In addition, according to the present invention, it is possible to resume the game from the state in which the game has been suspended with any game machine of the same kind which is installed in another game house by inputting the password. Thus, it is possible to enjoy successively the long-time video game which has been suspended at a different place and at a different time.

Although the status data consisting of the main factor for specifying the stage at the time of the interruption of the game and the sub factor for specifying the history of the game at the time of the interruption of the game is stored in the status memory in the illustrated embodiment, the present invention is not restricted thereto and other factors may be used as the status data.

For example, some video game machines for business use are so constructed as to ask the player to input a predetermined sequence of characters or symbols for identifying the player. Other video game machines use the individual data of the player such as the date of birth which is to be input by the player at the beginning of or during the game as the identification data.

In the present invention, it is possible to incorporate the player identification data such as a predetermined sequence of characters or symbols which is to be input at the beginning of or during the game into the status data, and to store the status data including such player identification data together with the main factor and the sub factor into the status memory.

In this way, the forward conversion circuit converts the status data consisting of the data of a predetermined sequence of characters or symbols input by the player, as described above, the main factor and the sub factor to a password easy to remember to the player by using a predetermined forward conversion function and displays it on the display circuit.

Particularly, according to the machine of this invention, the same kind of game machines use the same forward and backward conversion functions. As a result, if a password is inputted in the same way into the game machines arranged for other kind of video game, the game can be resumed from the point where the game was interrupted. Thus, a long-time video game which was interrupted before the end can be further played in the different time and different place.

Second Embodiment

Figure 2:
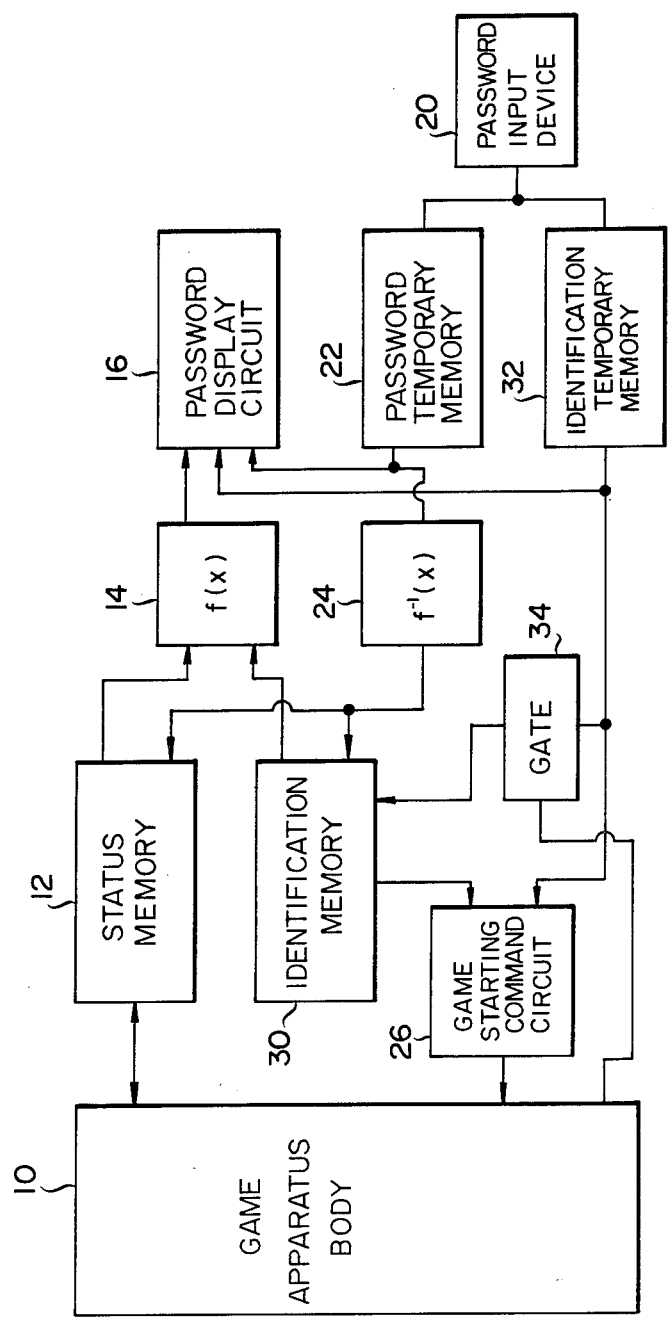
FIG. 2 is a block diagram of a second embodiment of a video game machine for business use according to the present invention.

A second embodiment of the present invention will now be explained with reference to FIG. 2.

The same numerals are provided for the same elements as those in the first embodiment, and explanation thereof will be omitted.

The feature of the second embodiment lies in that a combination of the status data which represents the progress of the game at the time of the interruption of the game and the identification data of the player is converted to a password easy to remember to the player by using a predetermined forward conversion function.

To this end, a game machine of the second embodiment is provided with an identification memory 30 for storing the player identification data, and the identification memory 30 outputs the player identification data to the forward conversion circuit 14.

The player can use the initial of the player, the identification number which has been set by the player and other identification data as the identification data to be written in the identification memory 30, as occasion demands. In this embodiment, the one alphabetical character indicating the initial of the player is used as the identification data. The character set as the identification data is output from the identification memory 30 to the forward conversion circuit 14 in the form of data of four bits shown in Table 2.

The forward conversion circuit 14 makes data represented by twelve digit binary numbers by combining the status data indicated by the eight digit binary numbers output from the status memory 12 and the four digit binary numbers output from the identification memory 30. The twelve digit binary numbers are converted, four digits at one time, to a password by using the forward conversion function shown in Table 1, and the password is output to the password display circuit 16.

In this embodiment, in the same way as in the first embodiment, the password display circuit 16 subsequently converts the input password of 12 bits to alphabetical characters, 4 bits at a time, as shown in Table 2, and displays three characters on the CRT as the password easy to remember to the player.

For example, if the player identification data is N, and the 11th stage has been passed and the first and fourth checkpoints at the 12th stage have been passed at the time of the interruption of the game, the data which is input to the forward conversion circuit 14 is represented by [1011/1001/1101/].

These twelve digit binary numbers are converted to the binary number data [0110/0101/1111] for a password by using the forward conversion function shown in Table 1, and the twelve digit binary data obtained by forward conversion is displayed as the password of three characters [GFP] in accordance with Table 2.

In order to resume the interrupted game with a machine of this embodiment, the password which has been displayed at the time of the interruption of the game and the player identification data are input to the password input device 20.

The thus-input password and the player identification data are temporarily stored as the data of four digit binary numbers shown in Table 2 in the password temporary memory 22 and an identification data temporary memory 32, respectively, and are displayed as the alphabetical characters on the CRT by the password display circuit 16.

After the input of the data has been completed, the input password is output from the password temporary memory 22 to the backward conversion circuit 24 as the data of twelve digit binary numbers.

The backward conversion circuit 24 converts the thus-input data for a password of twelve digit binary numbers by using the backward conversion function shown in Table 1, and outputs it as the status data representing the progress of the game and the player identification data.

The status data output from the backward conversion circuit 24 is written and stored in the status memory 12 in the same way as in the first embodiment, and the player identification data is written and stored in the identification memory 30.

When the status data and the identification data output from the backward conversion circuit 24 have been written in the respective memories 12, 30, the game starting command circuit 26 judges whether or not the identification data which has been written in the identification memory 30 coincides with the identification data which has been written in the identification data temporary memory 32, and the judgement data is output to the game apparatus body 10.

When the game apparatus body 10 judges on the basis of the thus-input judgement signal that the identification data written in the identification memory 30 and the identification data written in the identification data temporary memory 32 coincide, the game apparatus body 19 sets the initial condition on the basis of the status data written in the status memory 12 and allows the game to be resumed from the state in which the game has been suspended.

On the other hand, when the game apparatus body 10 judges that the identification data output from the memories 30 and 32 do not coincide, a gate circuit 34 is opened to write and store the identification data written in the identification data temporary memory 32 in the identification memory 30 as new identification memory.

At the same time with this, the status data written in the status memory 12 is cleared and the game is started from the beginning regardless of the input password.

As described above, according to this embodiment, in order to resume the game, the password input device 20 is used to input the password displayed at the time of the interruption of the game, for example, [GFP] and the identification data of the player, for example, [N].

Then, the three characters [GFP] input as the password are input into the backward conversion circuit 24 through the password temporary memory 22 as the twelve bit data [0110/0101/1111], and the backward conversion circuit 24 converts the twelve digit binary data to the status data [1011/1001] and the identification data [1101] indicating the character [N] by using the backward conversion function shown in Table 1. These status data and identification data are written and stored in the status memory 12 and the identification memory 30, respectively.

The game machine of this embodiment compares the identification data written in the identification data temporary memory 32 with the identification data written in the identification memory 30.

If the identification data written in the memory 32 is [N] representing the player at the time of the interruption of the game, since the identification data stored in the identification memory 30 coincides with the identification data stored in the temporary memory 32, the game starting command circuit 26 outputs a coincidence signal, whereby the game apparatus body 10 allows the game to be resumed from the state in which the game has been suspended, as described above.

On the other hand, if the identification data written in the memory 32, for example, the input identification data [M], is different from the character which represents the player at the time of the interruption of the game, the identification data in the memories 30 and 32 do not coincide, and the game is to be started from the beginning regardless of the input password.

At this time the identification data [M] input in the memory 32 is written and stored in the identification memory 30.

Although in the identification data illustrated in the first and second embodiments, the serial data are converted simply by backward conversion in order to simplify the explanation, it is possible to merge these data in a desired arrangement and to replace forward conversion with backward conversion. Furthermore, it is also possible to combine a plurality of conversion functions and make and convert a password.

Although the password and the player identification data are input in one password input device in the illustrated embodiments, it is also possible to provide a password input device and an identification input device separately from each other.

In addition, although only the "status data" and the "identification data" are converted and reconverted in the illustrated embodiments, it is also possible to add other necessary data at the time of the interruption of the game to these "status data" and the "identification data", and to convert them into a password using the forward conversion function and reconvert the password to the original data using the backward conversion function.

It goes without saying that although the simple go-through-labyrinth game is illustrated in these embodiments, the machine of the present invention is adaptable to other kinds of long-time games, as occasion demands.

Although the password is displayed on the CRT by the display circuit 16 in the embodiments, it is also possible to so design the game machine as to print the password output from the forward conversion circuit using a printer or the like and hand it in to the player.

Furthermore, although alphabetical characters are adopted as the password in the embodiments, various kinds of characters, symbols or patterns may be used, if necessary, in the present invention.

It goes without saying that the present invention is effective to a video game machine for business use which sets one playing time at a short time in a different way from that in the first embodiment, in which one playing time is set at a predetermined constant time.

For example, as known in a conventional short-time video game, it is possible to set one playing time by the number of fails of a hero or downfalls of an object. In this case, if the hero fails three times, for example, the game is suspended, and the password is displayed. The player inputs the password to resume the game from the state in which the game has been suspended and he can enjoy the game until the hero fails another three times.

Thus, the present invention is adaptable to various kinds of video game machines for business use in which one playing time is restricted to a predetermined short time in various ways and enables them to carry out long-time games.

As described above, the present invention enables a video game machine for business use in which one playing time is restricted to a predetermined short time to carry out a long-time video game without using any special external memory.

TABLE 1

| Forward Conversion Function f(x) → | |
|---|---|
| Backward Conversion Function $f^{-1}$ (x) ← | |
| 0000 (0) | 0000 (0) |
| 0001 (1) | 0001 (1) |
| 0010 (2) | 0111 (7) |
| 0011 (3) | 0010 (2) |
| 0100 (4) | 1000 (8) |
| 0101 (5) | 0011 (3) |
| 0110 (6) | 1001 (9) |
| 0111 (7) | 0100 (4) |
| 1000 (8) | 1010 (10) |
| 1001 (9) | 0101 (5) |
| 1010 (10) | 1011 (11) |
| 1011 (11) | 0110 (6) |
| 1100 (12) | 1100 (12) |
| 1101 (13) | 1111 (15) |
| 1110 (14) | 1101 (13) |
| 1111 (15) | 1110 (14) |

TABLE 2

| 0000 (0) | A | 0001 (1) | B | 0010 (2) | C | 0011 (3) | D |
|---|---|---|---|---|---|---|---|
| 0100 (4) | E | 0101 (5) | F | 0110 (6) | G | 0111 (7) | H |
| 1000 (8) | I | 1001 (9) | J | 1010 (10) | K | 1011 (11) | L |
| 1100 (12) | M | 1101 (13) | N | 1110 (14) | O | 1111 (15) | P |

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A video game machine for business use for carrying out a long-time video game comprising:
   a status memory for storing status data which represents the progress of a game at the time of the interruption of said game;
   a forward conversion circuit for converting said status data to a password which is easy to remember to the player by using a forward conversion function and for outputting said password, said forward conversion circuit being exclusive for said long-time video game which is carried out by said video game machine;
   a display circuit for displaying the output password to said player;
   a password input device to which said password is input by said player at the time of resuming said game;
   a backward conversion circuit for converting the input password to said status data at the time of the interruption of said game by using a backward conversion function and performing a backward conversion which corresponds to conversion of said forward conversion circuit and for outputting said status data;
   characterized in that during the time of the interruption of said game, said status data is forward converted into a password and the thus forward converted password is displayed to said player and when said game is resumed said input password is backward converted to a status data and based upon the thus backward converted status data the initial condition of said game is set, and said game is resumed from the state in which said game has been suspended.

2. A video game machine for business use for carrying out a long-time video game in which a stage on a picture is changed over successively to a next stage in accordance with a predetermined story according to claim 1, wherein said status memory stores a main factor which specifies the stage at the time of the interruption of said game and a sub factor which specifies the history of said game as said status data.

3. A video game machine for business use for carrying out a long-time video game according to claim 1, further comprising:
   an identification memory for storing player identification data; and
   a game starting command circuit for outputting a game resumption enabling signal;
   said forward conversion circuit converting at least a combination of said status data and said identification data stored in said status memory and said identification memory, respectively, to a password which is easy to remember to said player by using said predetermined forward conversion function;
   said password inputting device having a means to which said password is input by said player at the time of resuming said game and a means to which said identification data is input by said player at the time of resuming said game;
   said backward conversion circuit converting the input password to said status data at the time of the interruption of said game and said player identification data by using said backward conversion function, and outputting said status data and said identification data obtained by backward conversion; and
   said game starting command circuit outputting said game resumption enabling signal when said player identification data which is output from said backward conversion circuit coincides with said player identification data which is directly input from said password input device;
   characterized in that when said game resumption enabling signal is output from said game starting circuit, said initial condition of said game is set on the basis of said status data output from said backward conversion circuit and said game is resumed from the state in which said game has been suspended.

4. A video game machine for business use for carrying out a long-time video game in which a stage on a picture is changed over successively to a next stage in accordance with a predetermined story according to claim 3, wherein said status memory stores a main factor which specifies the stage at the time of the interruption of said game and a sub factor which specifies the history of said game as said status data.

5. A video game machine for business use according to claim 1, wherein said long-time video game is composed of a plurality of stages at which respective specific labyrinths are provided, and is so designed that the hero proceeds to the next stage whenever said hero passes the labyrinth at one stage by passing predetermined checkpoints provided in said labyrinth; and
   said status memory stores the number of the stages which have been passed before said game is suspended as a main factor and which checkpoints have been passed at the stage displayed at the time of the interruption of said game as a sub factor.

6. A video game machine for business use according to claim 1, wherein said display circuit displays said password in the form of alphabetical characters, symbols, and patters.

7. A video game machine for business use according to claim 1 further including a password temporary memory for temporarily storing said password which is input by using said password input device and a password display circuit which displays said inputted password on a CRT, so that said player can confirm said password on said CRT when inputting the same.

8. A video game machine for business use according to claim 3, wherein said player identification data which is written into said identification memory is any given necessary data such as the initial of said player and the identification number set by said player.

9. A video game machine for business use according to claim 3 further including a password temporary memory temporarily storing said password which is input by using said password input device, an identification data temporary memory temporarily storing an identification data of a player which is input by using said password input device and a password display circuit which displays said password and identification data on said CRT, so that said player can confirm said password and said identification data no said CRT when inputting the same.

10. A video game machine for business use according to claim 3, wherein said game starting command circuit compares an identification data of a player which is output from said backward conversion circuit with said player identification data which is input by said player at the time of resuming said game and when they are not coincide with each other then outputs a signal directing the start of said game from the beginning regardless of said password input.

11. A video game machine for business use according to claim 1, wherein said forward conversion circuit arranges said forward conversion function exclusive for said long-time video game carried out by said game machine by a combination of a plurality of conversion functions as a whole, converts said status data into said password by using said forward conversion functions, and then outputs said status data; and said backward conversion circuit arranges said forward conversion function exclusive for said long-time video game carried out by said game machine by a combination of a plurality of conversion functions as a whole and backward converts said password which is input through said password input device into said status data by using said backward conversion functions.

12. A video game machine for business use according to claim 1, further including a printer printing out said password which is output from said forward conversion circuit for said player.

13. A video game machine for business use according to claim 3, wherein said forward conversion circuit converts a group of said status data, said identification data and other data necessary at the time of the interruption of said game into a password by using forward conversion function, and outputs said password.

14. A video game machine for business use according to claim 1, further including a means for inputting a predetermined sequence of characters or symbols at the beginning of or during said game; and said status memory stores said predetermined characters or symbols input by said player as one of said status data which represent the progress of said game at the time of the interruption of said long-time video game; and said forward conversion circuit converts said status data into said password corresponding to a sequence of character of symbol by using said predetermined forward conversion function, and outputs said password.

15. A video game machine for business use according to claim 1, further including a means which controls not to allow the resumption of said game when said status data, which is at the time of interruption of said game and is output from said backward conversion circuit, is not included in a predetermined data for said video game machine for business use.

* * * * *